US008082290B2

(12) United States Patent
Pasko et al.

(10) Patent No.: US 8,082,290 B2
(45) Date of Patent: Dec. 20, 2011

(54) INTELLIGENT ESTABLISHMENT OF PEER-TO-PEER COMMUNICATION

(75) Inventors: Douglas M Pasko, Bridgewater, NJ (US); Jeffrey H Swinton, Mendham, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 632 days.

(21) Appl. No.: 12/050,989

(22) Filed: Mar. 19, 2008

(65) Prior Publication Data
US 2009/0240758 A1    Sep. 24, 2009

(51) Int. Cl.
G06F 15/16    (2006.01)
G06F 15/173    (2006.01)
(52) U.S. Cl. .................. 709/201; 709/223; 709/238
(58) Field of Classification Search .................. 709/201
See application file for complete search history.

(56) References Cited

U.S. PATENT DOCUMENTS

| | | | | |
|---|---|---|---|---|
| 5,491,690 A * | 2/1996 | Alfonsi et al. | ............... | 370/404 |
| 5,606,602 A * | 2/1997 | Johnson et al. | ......... | 379/114.02 |
| 6,081,508 A * | 6/2000 | West et al. | ................... | 370/238 |
| 6,223,220 B1 * | 4/2001 | Blackwell et al. | ............ | 709/223 |
| 6,363,319 B1 * | 3/2002 | Hsu | ............... | 701/202 |
| 6,405,252 B1 * | 6/2002 | Gupta et al. | .................. | 709/224 |
| 6,427,170 B1 * | 7/2002 | Sitaraman et al. | ............ | 709/226 |
| 6,538,996 B1 * | 3/2003 | West et al. | ................... | 370/238 |
| 6,651,124 B1 * | 11/2003 | McAllister | ................. | 710/240 |
| 6,779,034 B1 * | 8/2004 | Mundy et al. | ................. | 709/227 |
| 6,963,575 B1 * | 11/2005 | Sistanizadeh et al. | ....... | 370/404 |
| 6,977,931 B1 * | 12/2005 | Hadziomerovic | ............ | 370/392 |
| 7,058,706 B1 * | 6/2006 | Iyer et al. | ...................... | 709/223 |
| 7,610,241 B1 * | 10/2009 | Belanger et al. | ................ | 705/37 |
| 2001/0045914 A1 * | 11/2001 | Bunker | ......................... | 343/895 |
| 2002/0152309 A1 * | 10/2002 | Gupta et al. | .................. | 709/225 |
| 2003/0208621 A1 * | 11/2003 | Bowman | ...................... | 709/242 |
| 2004/0111724 A1 * | 6/2004 | Libby | .......................... | 718/100 |
| 2005/0048962 A1 * | 3/2005 | Wan et al. | .................. | 455/422.1 |
| 2006/0073788 A1 * | 4/2006 | Halkka et al. | ............... | 455/41.2 |
| 2007/0002796 A1 * | 1/2007 | Horn et al. | .................... | 370/331 |
| 2007/0053342 A1 * | 3/2007 | Sierecki et al. | ............... | 370/351 |
| 2007/0086361 A1 * | 4/2007 | Allan et al. | .................... | 370/254 |
| 2007/0245010 A1 * | 10/2007 | Arn et al. | ...................... | 709/223 |
| 2007/0245034 A1 * | 10/2007 | Retana et al. | ................ | 709/238 |
| 2007/0261004 A1 * | 11/2007 | Swildens et al. | .............. | 715/811 |
| 2008/0037438 A1 * | 2/2008 | Twiss et al. | ................... | 370/252 |
| 2008/0137580 A1 * | 6/2008 | Axelsson et al. | ............ | 370/315 |
| 2008/0137815 A1 * | 6/2008 | Paden et al. | ................ | 379/88.01 |
| 2009/0161688 A1 * | 6/2009 | Park et al. | .................... | 370/441 |
| 2009/0204711 A1 * | 8/2009 | Binyamin | ..................... | 709/226 |

OTHER PUBLICATIONS

Notification of Transmittal of the International Search Report and the Written Opinion of the International Searching Authority, or the Declaration corresponding to PCT/US2009/037232, dated May 12, 2009, 11 pages.
Xie et al., "P4P Proactive Provider Assistance for P2P", Presented May 25, 2007 at 1st NYC P2P Workshop, New York, NY.

* cited by examiner

Primary Examiner — Saleh Najjar
Assistant Examiner — Robert Shaw

(57) ABSTRACT

A device may receive, from a first peer in a network, a request for a list of one or more candidate peers from which the first peer can obtain a resource. In addition, the device may obtain the list in response to the request, determining a set of costs based on the list, and refine the list to obtain a subset list of the candidate peers based on the set of costs. Furthermore, the device may send to, the first peer, the subset list of the candidate peers from which the first peer can obtain the resource.

19 Claims, 8 Drawing Sheets

500

| POINT-OF-PRESENCE (POP) ID 504 | ADDRESS 506 | LOCATION 508 | NETWORK OWNER 510 | NETWORK IDENTIFIER 512 |
|---|---|---|---|---|
| 1123 | 234.191.34.x | NEW YORK, NY | VERIZON | ETHERNET |
| 8429 | 132.32.234.x | CHICAGO, IL | AT & T | X |

502 —

*800*

| PEER ID | RESOURCE | ADDRESS |
|---|---|---|
| BOBCAT | PSYCHO1.MOV | 234.191.34.3:92 |
| ALADDIN | PSYCHO1.MOV | 132.32.234.19:6879 |

802 — BOBCAT row
804 — ALADDIN row

*806*

| POP ID | ADDRESS | LOCATION | OWNER |
|---|---|---|---|
| POP1 | 234.191.34.x | NEW YORK | VERIZON |
| POP2 | 132.32.234.x | ILLINOIS | AT & T |
| POP3 | 132.32.232.x | ILLINOIS | VERIZON |

808 — POP1 row
810 — POP2 row
812 — POP3 row

814

US 8,082,290 B2

INTELLIGENT ESTABLISHMENT OF PEER-TO-PEER COMMUNICATION

BACKGROUND

In a client-server model, a client endpoint (e.g., a client application or a client device) may establish a network connection with a centralized server endpoint (e.g., a server application or a server device) to obtain resources. In a peer-to-peer (P2P) model, a peer endpoint may establish one or more network connections with one or more peer endpoints to either provide or obtain resources that are distributed over one or more peer endpoints.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF PREFERRED EMBODIMENTS

The following detailed description refers to the accompanying drawings. The same reference numbers in different drawings may identify the same or similar elements. As used herein, the term "peer-to-peer (P2P) connection" may refer to a connection in which participating endpoints may function as both a client endpoint and/or a server endpoint. In addition, as used herein, the term "point-of-presence" may refer to an access point to a network. The access point may include routers, servers, switches, and/or other network elements that share a common characteristic (e.g., a geographical location).

In implementations described herein, when a peer tracker receives a request from a peer for a list of candidate peers that can provide/accept a resource (e.g., a file, a memory, processing cycles, use of components of peer devices, etc.), the peer tracker in turn may send a request for cost information that is associated with communication between the requesting peer and other peers to a P2P cost information server.

When the P2P cost information server receives the request, the P2P cost information server may determine a point-of-presence (POP) for the requesting peer and for each of the other peers based on network addresses of the requesting peer and the other peers. Once a POP for each of the peers is determined, the P2P cost information server may obtain cost information based on network characteristics of each POP, such as a geographical location of the POP, the identity of an entity that owns the network in which the POP is located, etc. Alternatively, the P2P cost information server may retrieve predetermined cost information based on the POPs and may transmit the cost information to the requesting peer tracker.

When the peer tracker receives the cost information from the P2P cost information server, the peer tracker may use the cost information to refine the list of candidate peers. Accordingly, the peer tracker may generate a list that identifies a subset of the candidate peers and send the list of the subset to the requesting peer. The requesting peer may establish communication with and obtain/provide the resource from/to one or more peers in the subset. The subset of peers may provide/accept the resource to/from the requesting peer more efficiently than other peers of the candidate peers.

Figure 1:
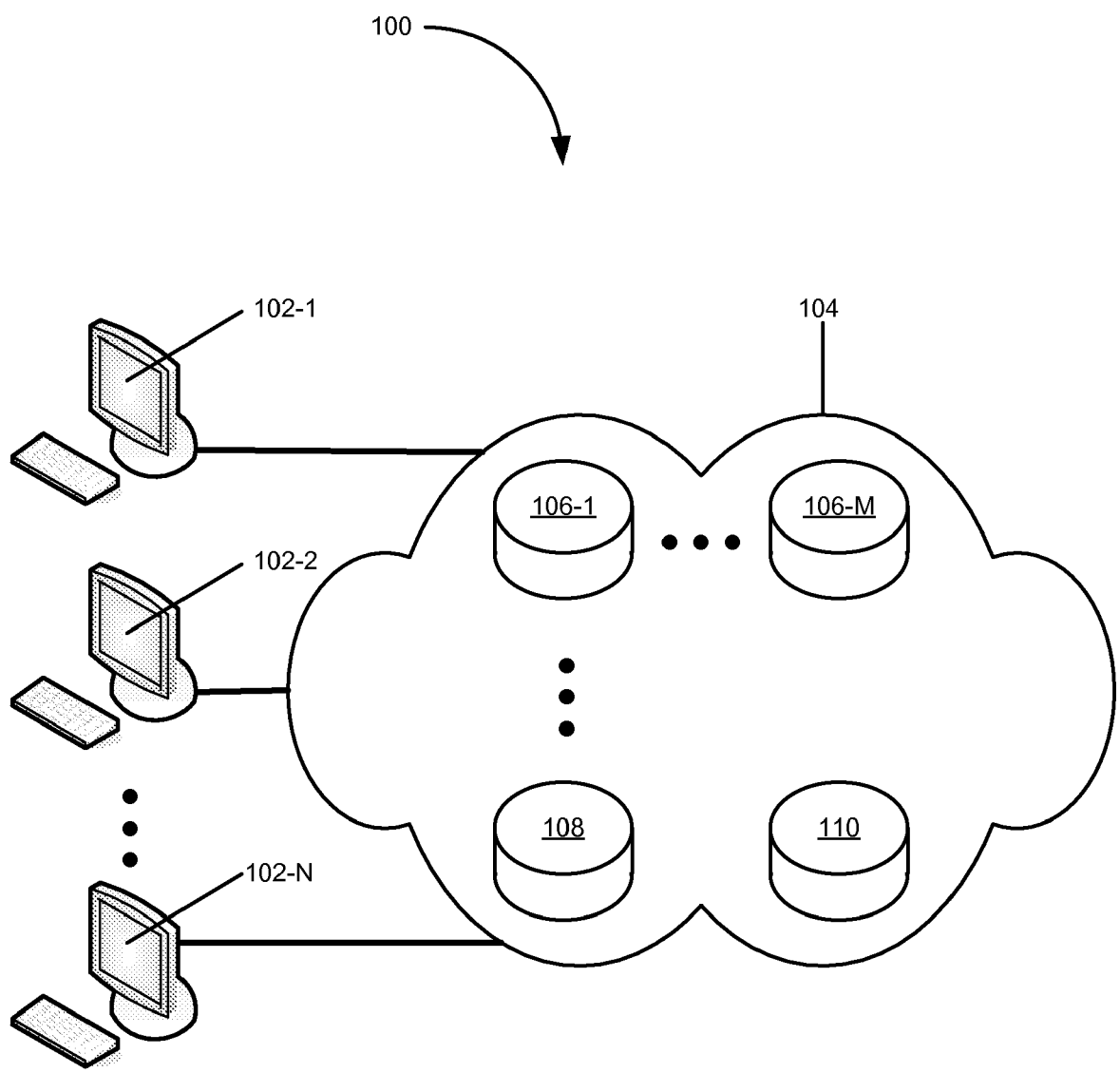
FIG. 1 is a diagram of an exemplary network in which concepts described herein may be implemented.

FIG. 1 is a diagram of an exemplary network 100 in which concepts described herein may be implemented. As shown, network 100 may include peer devices 102-1 through 102-N (hereinafter collectively referred to as peer devices 102, and generically and individually as peer device 102-x) and network 100.

Peer device 102-x may include a personal computer, a laptop, a personal digital assistant (PDA), a personal communication system (PCS) terminal that may combine a cellular radiotelephone with data processing, and/or other types of computing device capable of exchanging information with other devices in network 104.

Network 104 may include the Internet, an ad hoc network, a local area network (LAN), a wide area network (WAN), a metropolitan area network (MAN), a cellular network, a public switched telephone network (PSTN), an intranet, any other network, or a combination of networks. In FIG. 1, peer devices 102 may interact with one another via network 104.

As further shown in FIG. 1, network 104 may include network elements 106-1 through 106-M, a tracker device 108, and a P2P server device 110 that are interconnected through various network paths (not shown). Depending on the implementation, network 104 may include additional, fewer, or different components than the ones illustrated in FIG. 1.

Network elements 106-1 through 106-M may include devices such as routers, switches, servers, firewalls, and/or other devices for providing functionalities and services in a network (e.g., security).

Tracker device 108 may provide peer devices 102 with lists of peers from/to which peers that are hosted on peer devices 102 can obtain/provide resources. In one implementation, tracker device 108 may maintain state information about peers and may use both the state information and cost information (e.g., costs that are associated with communication between peers) that may be obtained from P2P server device 110. The state and cost information may be used to obtain lists of candidate peers that can provide the peers with resources (e.g., files, a period of game execution time, etc.). In some implementations, tracker device 108 may provide the state information and the candidate lists to the peers, and the peers may obtain the cost information directly from P2P server device 110.

P2P server device 110 may maintain a database of topological information and use the database to determine costs that are associated with communication between the peers. In addition, when P2P server device 110 may receive a request from tracker device 108/peer device 102-x for the cost information, P2P server device 110 may determine POPs for the peers and determine the cost information based on the POPs. P2P server device 110 may provide the cost information to tracker device 108 or the peers.

Figure 2:
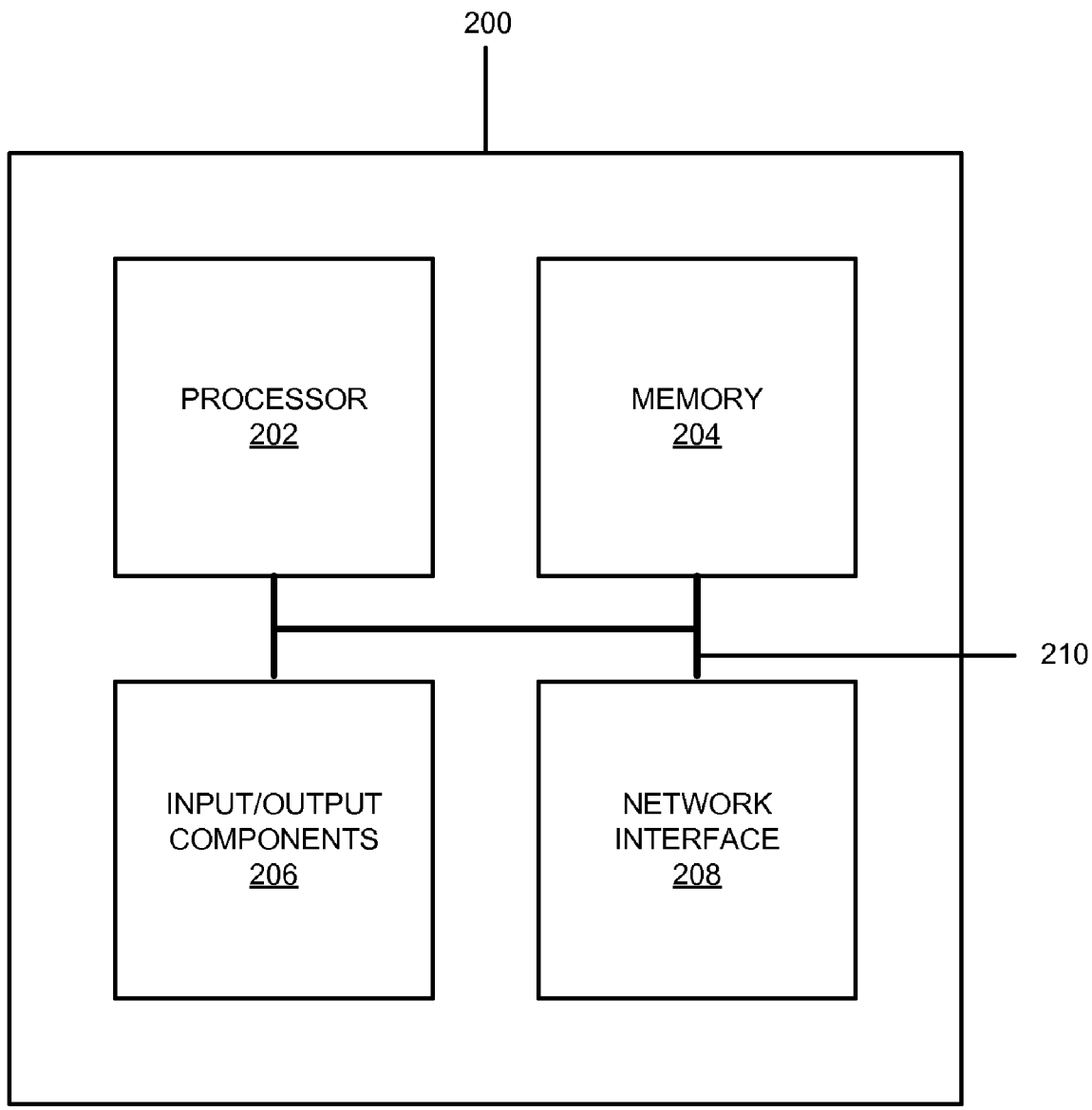
FIG. 2 is a block diagram of an exemplary network device of FIG. 1.

FIG. 2 is a block diagram of an exemplary network device 200. Network device 200 may correspond to peer device 102-$x$, one of network elements 106, tracker device 108, and/or P2P server device 110. As shown, network device 200 may include a processor 202, a memory 204, input/output components 206, a network interface 208, and communication paths 210. In different implementations, network element 200 may include additional, fewer, or different components than the ones illustrated in FIG. 2.

Processor 202 may include a processor, a microprocessor, an Application Specific Integrated Circuit (ASIC), a Field Programmable Gate Array (FPGA), and/or other processing logic capable of controlling network device 200. Memory 204 may include static memory, such as read only memory (ROM), dynamic memory, such as random access memory (RAM), and/or onboard cache, for storing data and machine-readable instructions. In some implementations, memory 204 may also include storage devices, such as a floppy disk, a CD ROM, a CD read/write (R/W) disc, and/or flash memory, as well as other types of storage devices.

Input/output components 206 may include a display (e.g., liquid crystal display (LCD), a cathode ray tube (CRT), etc.), a keyboard, a mouse, a speaker, a microphone, a Digital Video Disk (DVD) writer, a DVD reader, Universal Serial Bus (USB) lines, and/or other types of devices for converting physical events or phenomena to and/or from digital signals that pertain to network device 200.

Network interface 208 may include any transceiver-like mechanism that enables network device 200 to communicate with other devices and/or systems. For example, network interface 208 may include mechanisms for communicating via a network, such as the Internet, a terrestrial wireless network (e.g., wireless local area network (WLAN)), a satellite-based network, etc. Additionally or alternatively, network interface 208 may include a modem, a Bluetooth controller, an Ethernet interface to a local area network (LAN), and/or an interface/connection for connecting network device 200 to other devices.

Figure 3A:
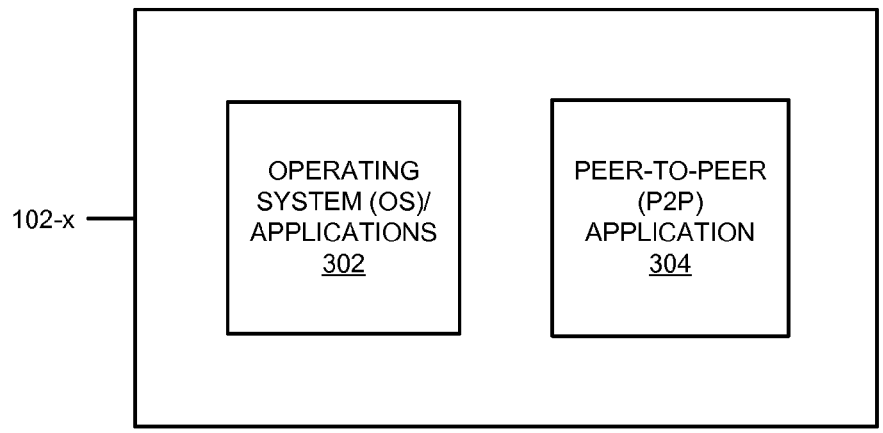
FIG. 3A is a functional block diagram of an exemplary network device of FIG. 1.

FIG. 3A is a functional block diagram of an exemplary peer device 102-$x$. As shown, peer device 102-$x$ may include operating system (OS)/applications 302 and a P2P application 304. Depending on implementation, peer device 102-$x$ may include fewer, additional, or different components than those illustrated in FIG. 3A. For example, peer device 102-$x$ may include software applications that are also hosted on tracker device 106.

OS/applications 302 may include a hardware/software component for performing various support functions for other components of device 102-$x$ and may provide for different functionalities of device 102-$x$. For example, OS/applications 302 may provide a browser as well as interfaces between the browser and the components in FIG. 3 (e.g., network interface 208). In yet another example, OS/applications 302 may provide a Transmission Control Protocol (TCP)/Internet Protocol (IP) stack to support communication applications, such as P2P application 304.

P2P application 304 may include a hardware/software component for requesting and receiving a list of candidate peers from a tracker, providing a resource to other peers (e.g., P2P application 304), and/or obtaining a resource from other peers. In some implementations, P2P application 304 may obtain cost information from P2P server device 110 to select a particular peer from which P2P application 304 may obtain the resource. Depending on context, the term "peer," as used herein, may refer to P2P application 304 or peer device 102-$x$ that hosts P2P application 304.

Figure 3B:
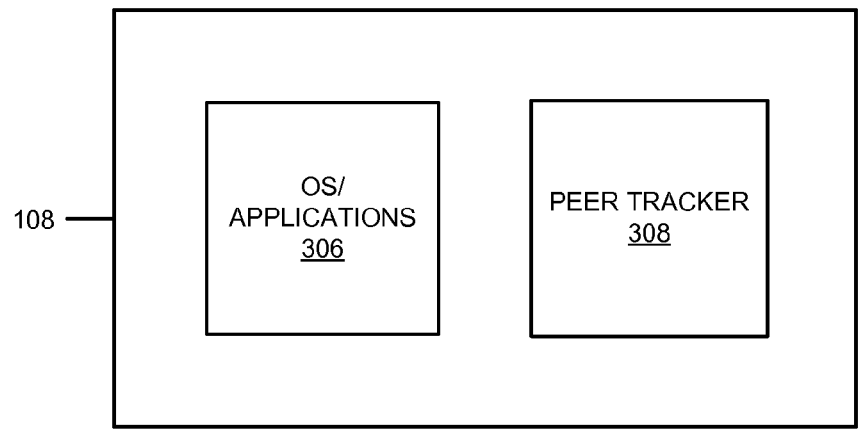
FIG. 3B is a functional block diagram of another exemplary network device of FIG. 1.

FIG. 3B is a functional block diagram of an exemplary tracker device 108. As shown, tracker device 108 may include OS/applications 306 and a peer tracker 308. Depending on implementation, tracker device 108 may include fewer, additional, or different components than those illustrated in FIG. 3B.

OS/applications 306 may perform various support functions for other components of tracker device 106 and/or may provide for different functionalities of tracker device 106, in a manner similar to OS/applications 302 for peer device 102-$x$. In addition, OS/application 306 may support functions that are specific to tracker device 106, such a large bandwidth communication, routing, etc.

Peer tracker 308 may include a hardware/software component for tracking peer states, receiving a request for a list of candidate peers from which a resource may be obtained or accessed, and refining the list of candidate peers. Peer tracker 308 may refine the candidate list by requesting cost information about a list of peers from P2P server device 110, by determining a subset of the candidate peers based on the cost information, and for providing a list of the subset of the candidate peers to the requesting peer.

In obtaining the list of candidate peers, peer tracker 308 may maintain and consult a peer state table (e.g., a database that stores state information associated with peers (e.g., a number of bytes that have been uploaded by a peer, an amount of time for which a peer has been uploading a resource, etc.)). Depending on the particular implementation, the peer state table may be updated based on messages from peers (e.g., a message that indicates a file upload has been completed).

Figure 3C:
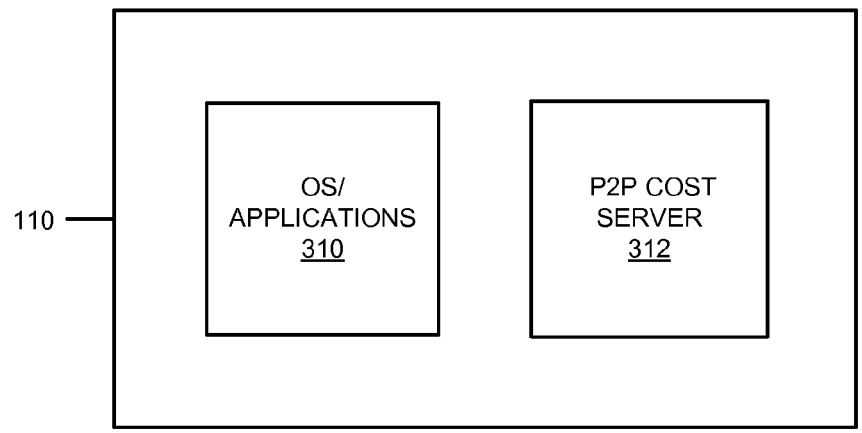
FIG. 3C is a functional block diagram of another exemplary network device of FIG. 1.

FIG. 3C is a functional block diagram of an exemplary P2P server device 110. As shown, P2P server device 110 may include OS/applications 310 and a P2P cost information server 312. Depending on implementation, P2P server device 110 may include fewer, additional, or different components than those illustrated in FIG. 3C.

OS/applications 310 may perform various support functions for other components of P2P server device 110 and may provide for different functionalities of P2P server device 110, in a manner similar to OS/applications 302 for peer device 102-$x$. In addition, OS/application 310 may support functions that are specific to P2P server device 106, such as providing a firewall to secure information related to peers.

P2P cost information server 312 may include a hardware/software component for receiving a request for cost information from and providing the cost information to an endpoint, such as a peer, peer tracker 308, peer device 102-$x$, P2P application 304, etc. In one implementation, the request from tracker device 108 may identify the requesting peer and a list of candidate peers. P2P cost information server 312 may determine a POP for each of the peers based on a POP table, which is described below, and/or determine cost information, either dynamically or based on a POP-to-POP cost matrix. The cost information may be sent to tracker device 108. Depending on the particular implementation, P2P cost information server 312 may populate and/or update the POP table and/or the POP-to-POP cost matrix.

Figure 4:
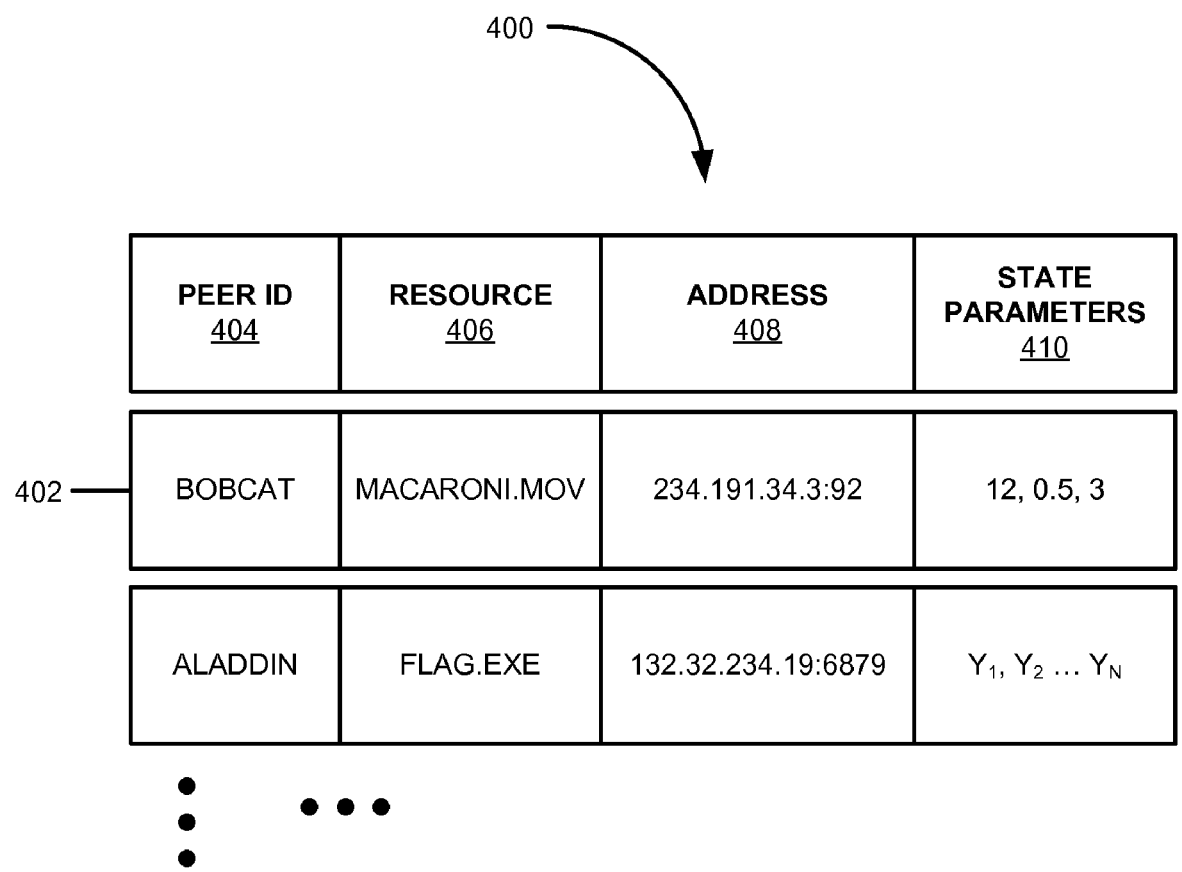
FIG. 4 is a block diagram of an exemplary peer state table.

FIG. 4 is a block diagram of an exemplary peer state table 400 that may be included in peer tracker 308. In a different implementation, peer state table 400 may be implemented separately from peer tracker 308. As shown, peer state table 400 may include one or more records, one of which is illustrated as record 402. As further shown in FIG. 4, each record in peer state table 400 may include a peer ID field 404, a resource field 406, an address field 408, and a state parameters field 410. Depending on the particular implementation, each record may include additional, fewer, or different fields than those illustrated in FIG. 4.

Peer ID field 404 may store an identifier for a particular peer. For example, peer ID field 404 for record 402 is shown as having a peer ID of BOBCAT. In some implementations, an identifier that is supplied by a peer may be matched against contents of peer ID field 404 and used along with other authentication information prior to permitting the peer to request a list of candidate peers. Resource field 406 may include an identifier for a resource that is provided by the peer. For example, resource field 406 of record 402 is illustrated as having an identifier MACARONI.MOV. In another implementation, the identifier may include a file path associated with the resource. Address field 408 may indicate an address of the resource. Even though address field 408 for record 402 is shown as having an Internet Protocol (IP) address and a port number of 234.191.34.3:92, in different implementations, other types of addresses may be stored in address field 408 (e.g., a universal resource locator (URL)). State parameters field 410 may store parameter values that represent a state of the peer. State parameters field 410 may include, for example, the latest percentage of available bandwidth of the peer, how long the peer may have been connected to another peer, whether the peer has been uploading or downloading a resource, whether the peer has permitted its processing cycles to be used by other peers, whether the peer is utilizing another peer's computing resources (e.g., a memory, a peripheral, an input/output component, etc.), etc. For example, in record 402, state parameters field 410 is illustrated as having values 12, 0.5, and 3, which may correspond to a bandwidth in megabits per second, a fraction of the bandwidth that is used, and a number of seconds that peer BOBCAT has been downloading MACARONI.MOV.

As described above, peer tracker 308 may consult peer state table 400 in responding to a request from a peer for a list of candidate peers from/to which the peer can obtain/provide a resource. For example, assume that a peer with peer ID of CARLOS connects to peer tracker 308 and requests a list of candidate peers that can provide a resource called MACARONI.MOV. Peer tracker 308 may identify a list of all candidate peers that can provide/accept the resource MACARONI.MOV, examine state information of the candidate peers, and send the state information and other information (e.g., addresses of the candidate peers) to P2P server device 110.

When peer tracker 308 receives a response from P2P server device 110, peer tracker 308 may use cost information for the candidate peers provided in the response to refine the list of candidate peers. To illustrate the use of state parameters and the cost information, assume that peer CARLOS makes a request to peer tracker 308 for a candidate peer to obtain a resource. Peer tracker 308 identifies two peers, peer X and peer Y that are characterized by a state parameter D that indicates whether a peer is uploading or downloading a file (e.g., a resource). Assume D="uploading" for peer X and D="downloading" for peer Y. In addition, assume that peer tracker 308 queries P2P server device 110 for cost information required for peer CARLOS to communicate with peer X and peer Y. Further assume that P2P server device 100 indicates that the cost for peer CARLOS to communicate with peer X includes a network latency of 100 milliseconds and the cost for peer CARLOS to communicate with peer Y includes the network latency of 200 milliseconds.

In the above, peer tracker 308 may compare the value of state parameter D for peer X to that of peer Y, and conclude that peer X, which is uploading the resource, may provide a superior resource access to peer CARLOS than peer Y. In addition, peer tracker 308 may determine that peer X provides for less network latency than peer Y. Consequently, peer tracker 308 may return the identity and/or the network address of peer X to peer CARLOS.

Figures 5A, 5B:
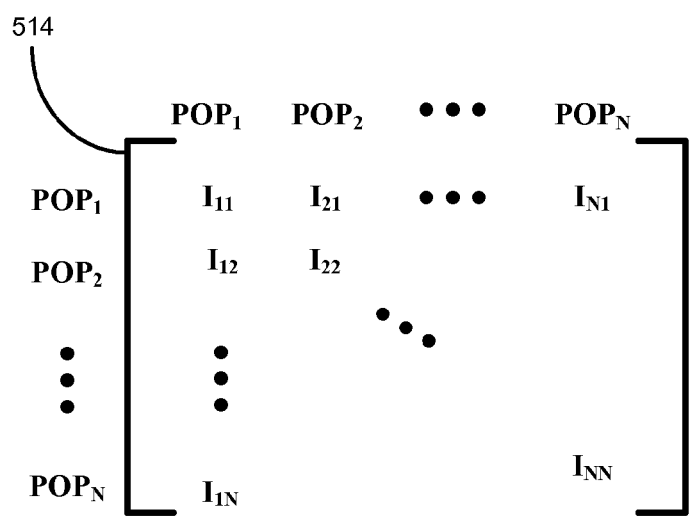
FIG. 5A is a block diagram of an exemplary point-of-presence (POP) table.
FIG. 5B shows an exemplary POP-to-POP cost matrix.

FIG. 5A is a block diagram of an exemplary point-of-presence (POP) table 500 that may be included in a P2P cost server 312 (FIG. 3C). In a different implementation, POP table 500 may be implemented separately from P2P cost server 312. As shown, POP table 500 may include one or more records, one of which is illustrated as record 502. As further shown in FIG. 5A, each record in POP table 500 may include a POP ID field 504, an address field 506, a location field 508, a network owner field 510, and a network identifier field 512. Depending on implementation, POP table 500 may include fewer, additional, or different fields than those illustrated in FIG. 5.

POP ID field 504 may store an identifier for a POP. Address field 506 may store one or more addresses that are associated with the POP. In FIG. 5A, for record 502, address field 506 is shown as having 234.191.34.x in Classless Inter-Domain Routing (CIDR) format. In a different implementation or setting, address field 506 may include a list of addresses. Location field 508 may include one or more geographical locations of the POP. For example, location field 508 of record 502 is shown as having the value "NEW YORK, NY." Network owner field 510 may indicate the identity of an entity that owns the network to which the POP belongs. For example, in record 502, a POP is shown as being owned by VERIZON. Network identifier field 512 may identify the type of network for the POP. For example, the POP in record 512 is indicated as being part of an Ethernet.

FIG. 5B is a block diagram of an exemplary POP-to-POP cost matrix 514 that may be included in P2P cost server 312 (FIG. 3C). In another implementation, in place of a single POP-to-POP cost matrix 514, multiple, smaller POP-to-POP cost matrices may be included in P2P cost server 312. In a different implementation, POP-to-POP cost matrix 514 may be implemented separately from P2P cost server 312.

As shown, each row and column of POP-to-POP cost matrix 514 may correspond to different POPs, and each element of POP-to-POP cost matrix 514 may correspond to a cost or a vector of costs that are associated with a communication link between one peer in a POP and another peer in a $POP_1$. For example, $I_{11}$ may represent a cost vector for a peer in $POP_1$ to communicate with another peer in $POP_2$. In a different implementation, each element of POP-to-POP cost matrix 514 may be a scalar.

Each of vectors $I_{11}, I_{22}, \ldots$, and $I_{NN}$ may include T-tuples of costs. For example, in one implementation, $I_{21}$ may include a tuple that represents <latency in milliseconds, cost of using a network per minute in dollars, an approximate physical distance between $POP_2$ and $POP_1$ in miles, an available bandwidth between two $POP_2$ and $POP_1$, amount of used bandwidth>, such as, for example, <100, 01, 100, 1 GHz, 0.01 GHz>. Depending on the particular implementation, each vector may include fewer, additional, or different types of parameters.

As already explained above in part, P2P cost information server 312 may employ POP table 500 of FIG. 5A and/or POP-to-POP cost matrix 514 of FIG. 5B when P2P cost information server 312 receives a request from an endpoint (e.g., a tracker device or a peer) for cost information for a set of peers.

To illustrate how POP table 500 and POP-to-POP cost matrix 514 may be used to obtain cost information, assume that a tracker device 108 requests cost information for communication between peer BOBCAT (FIG. 4) and peer ALADDIN. Upon receiving the identity of the pair of peers from tracker device 108, P2P cost information server 312 may perform a lookup in POP table 500 for each of the peers. As shown in FIG. 4, peer BOBCAT may have a network address of 234.191.34.3 and peer ALADDIN may have a network address of 132.32.234.19. Upon performing a lookup of peer BOBCAT and peer ALADDIN in POP table 500 based on their IP addresses, P2P cost information server 312 may determine that peer BOBCAT belongs to POP 1123, and peer ALADDIN belongs to POP 8429.

Upon finding the POPs for peer BOBCAT and peer ALADDIN, P2P cost information server 312 may consult POP-to-POP cost matrix 514 to obtain a vector of costs. For example, assuming that POP 1123 and POP 8429 correspond to $POP_1$ and $POP_2$ in FIG. 5B, P2P cost information server 312 may obtain 121 as the cost vector. Subsequently, P2P cost information server 312 may send cost vector 121 to tracker device 108.

In a different implementation, P2P cost information server 312 may not use POP-to-POP cost matrix 514, but may dynamically determine the costs based on information that is provided by different records in POP table 500. For example, to determine the cost vector for communication between peer BOBCAT and peer ALADDIN, P2P cost information server 312 may apply a function that computes a cost vector based on POP 1123 and POP 8429. If the function is assumed to be D(x, y), where D(x, y)=a geographical distance between POP x and POP y/1000 miles, then D(POP 1123, POP 8429)= Distance between New York, N.Y. and Chicago, Ill./1000 miles~=714 miles/1000 miles=0.714. Depending on the particular implementation, the function may account for different fields of the records in POP table 500. In some implementations, the function may produce a scalar value rather than a vector.

In some implementations, the function may be used to pre-compute POP-to-POP cost matrix 500 and/or to update POP-to-POP cost matrix 500 when POP table 500 is updated due to changes in network 100 (e.g., a new peer is added to network 100, an old peer is removed from network 100, etc.).

Figure 6:
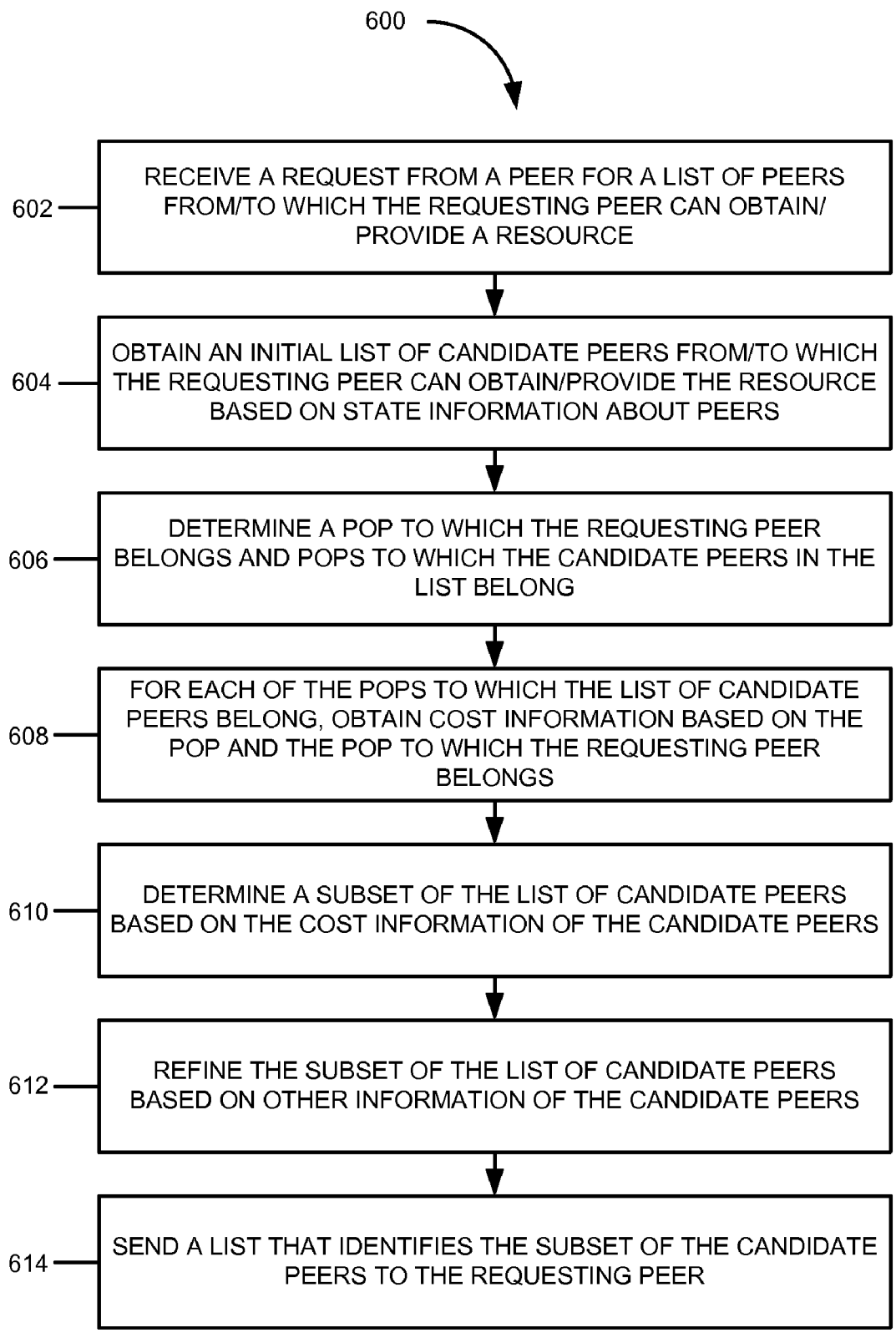
FIG. 6 is a flow diagram of an exemplary process for an intelligent establishment of peer-to-peer communication.

The above paragraphs describe system elements that are related to devices for intelligent establishment of peer-to-peer communication. FIG. 6 shows an exemplary process 600 that is capable of being performed by one or more of these devices and/or components.

Assume that a peer hosted on peer device 102-x has made a request to tracker device 108 for a list of peers from/to which the requesting peer can obtain/provide a resource. Process 600 may start at 602, where a network device (e.g., tracker device 108) receives a request from the peer for a list of candidate peers from/to which the peer can obtain/provide a resource (block 602).

Peer tracker 308 in the network device may obtain an initial list of candidate peers from/to which the requesting peer can obtain/provide the resource (block 604). As described above in connection with peer state table 400, peer tracker 308 in the network device 200 may identify all candidate peers that are capable of providing the resource based on state information of the peers (e.g., bandwidth, the duration of time for which a peer has been providing/accessing a resource, whether the peer can provide the resource, etc.).

At block 604, if peer tracker 308 and P2P cost information tracker 312 are implemented as two separate components or are hosted on two different network devices, information related to the candidate peers and the requesting peer may be conveyed from peer tracker 308 to P2P cost information server 312. The conveyed information may include network addresses (e.g., IP addresses, URL, etc.) of the requesting peer and the candidate peers, the state information of the candidate peers, etc.

P2P cost information server 312 may determine a POP to which the requesting peer belongs and POPs to which the candidate peers in the list belong (block 606). For the requesting peer and each of the candidate peers in the list, P2P cost server 312 may perform a lookup in POP table 500. As described above with reference to FIG. 5A, each lookup may be performed by comparing the network address of a peer to values in address field 504 of one or more records in POP table 500.

For each of the POPs to which the list of candidate peers belong, P2P cost information server 312 may obtain cost information based on the POP and a POP to which the requesting peer belongs (block 608). In one implementation, the cost information may include a cost vector or a scalar that is retrieved via a lookup of a POP-to-POP cost matrix 514. For example, if the requesting peer belongs to $POP_1$ and a candidate peer in the list belongs to $POP_N$, then, based on POP-to-POP cost matrix 514, the cost vector may include $1_{1N}$. In a different implementation, as described above with reference to P2P cost information server 312, the cost vector/scalar may be dynamically determined.

At block 608, if peer tracker 308 and P2P cost information tracker 312 are implemented as two separate components or are hosted on two different network devices, the cost information may be conveyed from P2P cost information server 312 to peer tracker 308.

Peer tracker 308 may obtain a subset of the list of candidate peers based on the cost information of the candidate peers (block 610), as explained above with respect to FIG. 4. Optionally, peer tracker 308 may further refine the subset of the list of candidate peers based on other information (e.g., the state information) (block 612). The other information may include whether a candidate peer may be uploading or downloading a file, sharing its processing cycles with another peer, etc., and or any other characteristics that may be relevant for obtaining and/or sharing the resource.

At block 614, peer tracker 308 may send a list that identifies the subset of peers (e.g., network addresses of the subset of peers) to the requesting peer (block 614). When the requesting peer obtains the list, the requesting peer may establish communication with and obtain the resource from the identified subset of peers.

In the above, at blocks 606-612, process 600 may refine the initial list of candidate peers based on the cost information and/or the state information of the candidate peers. By refining the initial list of candidate peers, process 600 may obtain a list of peers that may allow the requesting peer to select peers that can efficiently provide/accept the resource.

The following example, with reference to FIGS. 7, 8A, 8B, and 8C, illustrates a process for an intelligent establishment of peer-to-peer communication. The example is consistent with the exemplary process described above with reference to FIG. 6.

Figure 7:
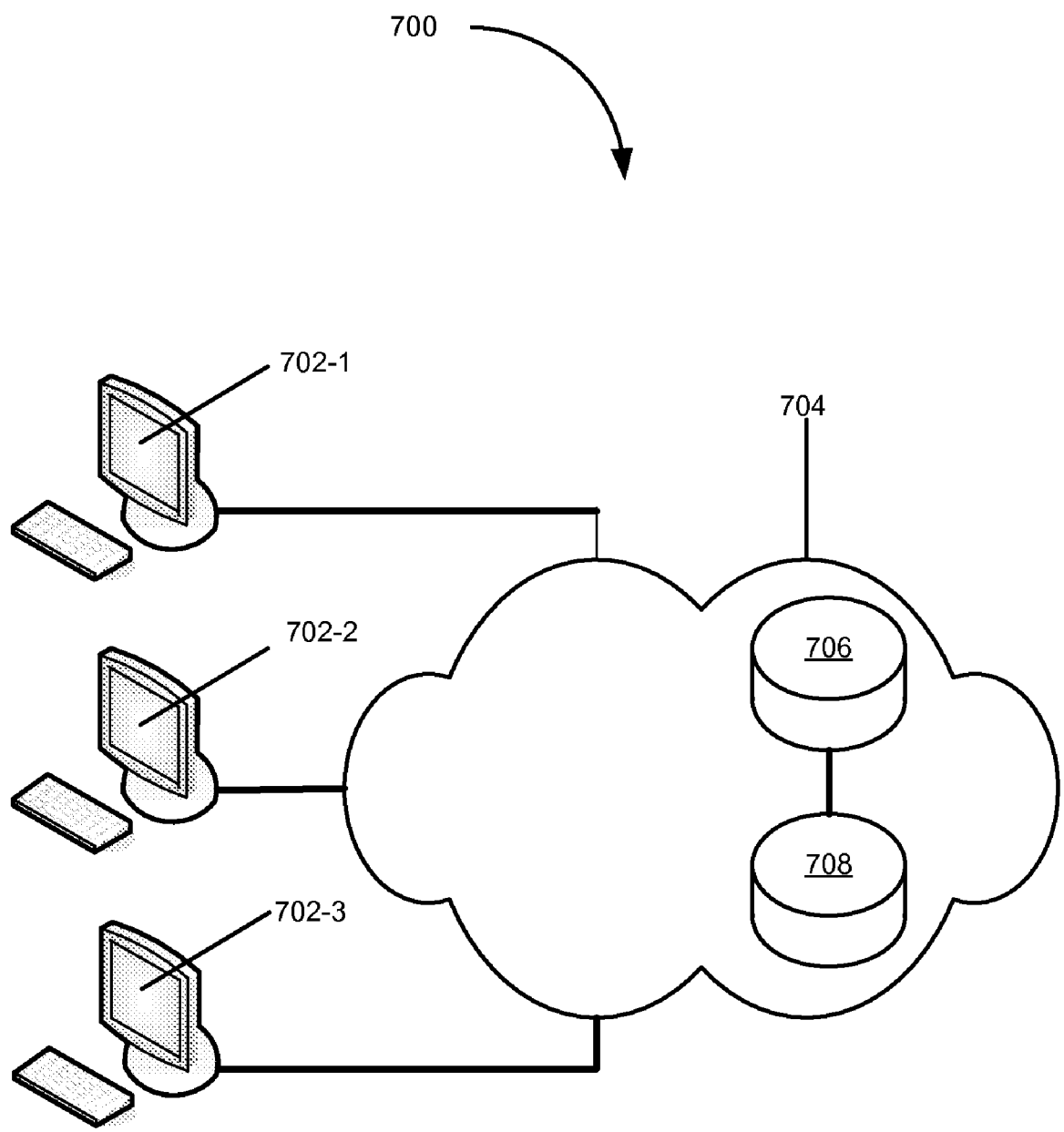
FIG. 7 is a diagram of another exemplary network in which the concepts described herein may be implemented.

In the example, as illustrated in FIG. 7, assume that a network 700 includes peers 702-1, 702-2, and 702-3 with IP addresses of 132.32.232.156, 234.191.34.3, and 132.32.234.19, respectively, and a network 704. In addition, assume that network 704 includes tracking device 706 and P2P server device 708. Further, assume that each of peer devices 702-2 and 702-3 have uploaded a video clip, PSYCHO1.MOV to different peers (not shown), and that tracker device 706 maintains state information for peer devices 702-2 and 702-3.

Figures 8A, 8B, 8C:
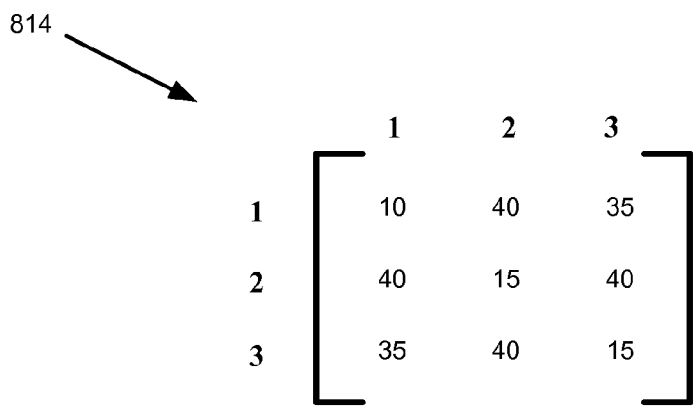
FIG. 8A is a block diagram of another exemplary state table.
FIG. 8B is a block diagram another exemplary POP table.
FIG. 8C shows another exemplary POP-to-POP cost matrix.

Peer device 702-1 sends a message to tracker device 706, requesting information about peer devices from which peer device 702-1 can download PSYCHO1.MOV (e.g., resource). Upon receiving the request, peer tracker 308 in tracker device 706 consults a peer state table. FIG. 8A shows the peer state table 800 that is included in tracker device 706. As shown, peer state table 800 includes record 802 for peer device 702-2 and record 804 for peer device 702-3.

By consulting peer table 800 based on the resource PSYCHO1.MOV, peer tracker 308 retrieves records 802 and 804, and sends a request message to P2P server device 708. The request message includes information about peer device 702-1 and information stored in records 802 and 804.

P2P server device 708 receives the request message, and performs lookups in a POP table. FIG. 8B shows the POP table 806. By performing the lookups based on the IP addresses of the list of peer devices 702-1, 702-2, and 702-3, P2P cost information server 312 in P2P server device 708 determines that the IP address of peer device 702-1 (e.g., 132.32.232.156) matches the contents of the address field of record 808 (e.g., 132.32.232.x). P2P cost information server 312 also matches the IP address of peer device 702-2 (e.g., 234.191.34.3) to the contents of the address field of record 810 (e.g., 234.191.34.x). In addition, P2P cost information server 312 matches the IP address of peer device 702-3 (e.g., 132.32.234.19) to the contents of the address field of record 812 (e.g., 132.32.234.x). Based on the matching addresses, P2P cost information server 312 determines that peer devices 702-1, 702-2, and 702-3 belong to POP3, POP1, and POP2, respectively.

After determining the POPs for the peer devices, P2P cost information server 312 performs a lookup of cost information in a POP-to-POP cost matrix 814. FIG. 8C shows the POP-to-POP cost matrix 814. Using POP-to-POP cost matrix 814, P2P cost information server 312 identifies a cost for communication between peer devices 702-1 (POP3) and 702-2 (POP1) by locating a matrix element at column 3 and row 1 of POP-to-POP cost matrix 814. As shown in FIG. 8C, the cost is 35 milliseconds (e.g., latency). Similarly, P2P cost information server 312 identifies a cost for communication between peer devices 702-1 (POP3) and 702-3 (POP2). As show in FIG. 8C, at column 3 and row 2, the cost is 40 milliseconds.

Having determined the cost information for peer device 702-1 to communicate with peer devices 702-2 and 702-3, P2P cost information server 312 sends the cost information to tracker device 706. Based on the cost information, tracker device 706 determines that peer device 702-1 may be able to download PSYCHO1.MOV more efficiently from peer device 702-2 than from peer device 702-3. Tracker device 706 sends a response to the message from peer device 702-1, identifying peer device 702-2 as the best peer device from which to download PSYCHO1.MOV. Peer device 702-1 establishes a communication session with peer device 702-2 based on the response.

In the above example, a P2P cost information server may provide information about costs (e.g., network latency) that are related to communication between two or more peers. The cost information may be used by different entities of the network, such as tracker device 706. In the example, by using the cost information, tracker device 706 may provide the identify of a peer device from which requesting peer device 702-1 may obtain a resource more efficiently than from other peer devices that are identified based on state information.

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks has been described with regard to an exemplary process illustrated in FIG. 6, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:

receiving, from a first peer in a network, a request for a list of one or more candidate peers from which the first peer can obtain a resource over the network;

obtaining the list of one or more candidate peers from memory or a remote device in response to the request for the list of one or more candidate peers;

determining a set of costs based on the list of one or more candidate peers;

refining the list of one or more candidate peers to obtain a subset list of the candidate peers from which the first peer can obtain the resource based on the set of costs; and sending to, the first peer in the network, the subset list of the candidate peers from which the first peer can obtain the resource, wherein determining the set of costs includes:

determining a first point-of-presence for the first peer by identifying the first point-of-presence corresponding to the first peer in one or more point-of-presence tables;

obtaining first one or more cost parameters, in the one or more point-of-presence tables, that are associated with the first point-of-presence;

determining a point-of-presence and one or more cost parameters associated with the point of presence, for each peer in the list, by identifying the point-of-presence corresponding to the peer in the one or more point-of-presence tables; and determining a cost for each peer in the list based on the first one or more cost parameters and the one or more cost parameters associated with the determined point-of-presence for the peer,
  wherein the cost includes a cost of communication between the point-of-presence to which the peer belongs and the first point-of-presence.

2. The method of claim 1, wherein refining the list includes:
selecting a subset of the candidate peers with optimal costs.

3. The method of claim 1, wherein determining a cost for each peer includes one of:
  determining a scalar value; or
  determining a cost vector.

4. The method of claim 3, wherein determining a scalar value includes at least one of:
  dynamically determining the scalar value based on the first one or more cost parameters and the one or more cost parameters associated with the peer.

5. The method of claim 1, further comprising:
  updating the one or more point-of-presence tables to reflect changes to the network.

6. The method of claim 1, wherein determining a cost for each peer includes at least one of:
  determining network latency between the point-of-presence to which each peer belongs and the first point-of-presence; or
  determining monetary cost of communication between the point-of-presence to which each peer belongs and the first point-of-presence.

7. The method of claim 6, wherein determining network latency includes:
  determining a delay in communication between the point-of-presence to which each peer belongs and the first point-of-presence based on at least one of:
  geographical locations of the point-of-presence and the first point-of-presence; and
  identities of one or more entities that own one or more networks to which the point-of-presence and the first point-of-presence belong.

8. The method of claim 1, wherein determining a first point-of-presence includes:
  retrieving, in the one or more point-of-presence tables, a record whose one or more addresses match an address of the first peer.

9. The method of claim 8, further comprising:
  updating the record when network information relating to the first point-of-presence changes.

10. The method of claim 1, wherein receiving, from a first peer, a request includes:
  receiving, from the first peer, a request for a list of peers whose processing cycles the first peer can use.

11. The method of claim 1, further comprising:
  obtaining network addresses of and state information associated with the first peer and the list of one or more candidate peers from a tracker device for tracking states of peer devices; and
  sending the network addresses and the state information to a peer-to-peer server device for determining a set of costs based on points-of-presence.

12. The method of claim 1, wherein the first peer includes a peer application for providing the resource to other peers.

13. A device comprising:
  a point-of-presence table;
  a point-of-presence-to-point-of-presence cost matrix that includes cost elements, wherein each of the cost elements includes cost of communication between two points-of-presence and is located in a row and a column of the point-of-presence-to-point-of-presence matrix and wherein the row corresponds to one of the two points-of-presence and the column corresponds to the other of the two points of presence; and
  a cost information server configured to:
    receive, from a tracker device, a request for a set of cost information associated with communication between a first peer in a network and each peer in a list of one or more peers, in the network, to which the first peer can provide a resource;
    determine a first point-of-presence for the first peer in the network by consulting the point-of-presence table;
    for each peer of the list, determine a point-of-presence by consulting the point-of-presence table;
    determine cost for each peer in the list by performing a lookup of the point-of-presence-to-point-of-presence cost matrix, wherein the determined cost includes one of the cost elements of the point-of-presence-to-point-of-presence cost matrix and wherein the one of the cost elements is in a row corresponding to the first point-of-presence and is in a column corresponding to a point-of-presence to which the each peer belongs; and
    send the determined costs for the one or more peers in the network to the tracker device.

14. The device of claim 13, wherein the tracker device includes:
  a peer tracker configured to:
    select a subset of the one or more peers based on the determined costs, and send a list of the subset to the first peer.

15. The device of claim 14, wherein the tracker device further includes:
  state information about one or more peers, the state information including at least one of:
  information that indicates whether the one or more peers are providing the resource or accessing the resource;
  an identifier for each of the one or more peers; or
  a network address of each of the one or more peers.

16. The device of claim 13, wherein the resource includes at least one of:
  processing cycles;
  a portion of a file;
  an application; or
  a memory.

17. The device of claim 13, wherein the one of the cost elements includes:
  a network latency between the point-of-presence to which the peer belongs and the first point-of-presence; or
  monetary cost of communication between the point-of-presence and the first point-of-presence.

18. The device of claim 13, wherein the point-of-presence table includes records used to produce an element of the point-of-presence-to-point-of-presence cost matrix, each of the records including at least one of:
  a network address associated with a point-of-presence;
  a name of a geographical location associated with the point-of-presence; or
  a name of an entity that owns a network to which the point-of-presence belongs.

19. A non-transitory computer-readable medium comprising computer executable instructions, the computer-executable instructions including:

instructions for receiving, from a first peer in a network, a request for a list of one or more candidate peers from which the first peer can obtain a resource over the network;

instructions for obtaining the list of one or more candidate peers from a memory or a remote device in response to the request for the list of one or more candidate peers;

instructions for determining a set of costs based on the list of one or more candidate peers;

instructions for sorting the list of one or more candidate peers in order of decreasing cost; and instructions for sending to, the first peer in the network, the list of the candidate peers from which the first peer can obtain the resource, wherein the instructions for determining the set of costs include instructions for:

determining a first point-of-presence for the first peer by identifying the first point-of-presence corresponding to the first peer in one or more point-of-presence tables;

obtaining first one or more cost parameters, in the one or more point-of-presence tables, that are associated with the first point-of-presence;

determining a point-of-presence and one or more cost parameters associated with the point of presence, for each peer in the list, by identifying the point-of-presence corresponding to the peer in the one or more point-of-presence tables; and determining a cost for each peer in the list based on the first one or more cost parameters and the one or more cost parameters associated with the determined point-of-presence for the peer, wherein the cost includes a cost of communication between the point-of-presence to which the peer belongs and the first point-of-presence.

* * * * *